United States Patent Office 2,831,779
Patented Apr. 22, 1958

2,831,779

SOIL CONDITIONERS

John G. Erickson, Minneapolis, Minn.

No Drawing. Application October 13, 1952
Serial No. 314,572

4 Claims. (Cl. 106—287)

The present invention relates to a process of improving clay soil and consists of adding small amounts of aminoquaternary ammonium compounds to the soil.

It is, therefore, an object of the present invention to provide a process of improving the properties of clay soil by means of an aminoquaternary ammonium compound.

Several soil conditioners have been reported recently. Most of them are composed essentially of sodium polyacrylate. Another type is the salt of a copolymer of maleic acid and vinyl acetate. All of these conditioners, however, are polyanionic.

In contrast to these prior soil conditioners, the present soil conditioners are polycationic. They comprise the aminoquaternary ammonium compounds containing one amino group and a quaternary ammonium group.

The effects produced by the aminoquaternary ammonium compound depend upon the nature of the compound. An important use of these aminoquaternary ammonium compounds is for conditioning clay soil for agricultural purposes. The amino group and the quaternary ammonium group react with the soil particles and tend to bind individual particles into aggregates of larger size which no longer possess the colloidal properties of clay when wet. By employing a compound which has an appreciable solubility in water (5% or more based on the weight of the solution), it is found that the principal effect on clay soil is an improvement in the porosity and friability of the soil. At the same time the soil is put into a condition in which it may be readily wetted.

They are also useful for the stabilization of colloidal soils against erosion. A specific use of this type is the stabilization of colloidal beach soil to prevent erosion and to modify its characteristics to simulate a sand beach.

The invention also contemplates the use of aminoquaternary ammonium compounds which are less soluble than those referred to above, but which still are capable of reacting with the soil to affect its properties. Generally, these aminoquaternary ammonium compounds of lesser solubility are useful for other than agricultural purposes. They tend to waterproof the soil so that the soil is not easily wetted, and these compounds may be used in soil stabilization for road building and the like.

The aminoquaternary ammonium compounds which are quite soluble in water react readily with the soil and immediately change the characteristics of the soil. Those which are less soluble than 5% react more slowly with the soil, but in view of their limited solubility, are not readily leached from the soil. Accordingly, they remain in the soil and gradually dissolve and react with the soil particles as the molecules of the aminoquarternary ammonium compound already in solution are removed therefrom by reaction with the soil. Accordingly, it is possible to employ aminoquaternary ammonium compounds with very low degrees of solubility, even lower than 1/10 of 1%. The aminoquaternary ammonium compound may be used in very small amounts, usually from 0.05-0.5% based on the weight of the soil. However, even smaller quantities produce some desirable results, and it is apparent that even larger amounts may be used. Usually, however, it is not necessary to use a quantity in excess of 1%.

Any aminoquaternary ammonium compound may be used which contains one quaternary ammonium group and one amino group, the latter being sufficiently basic to form an acetate salt. The nitrogen atoms of the aminoquaternary ammonium compound can be separated by a hydrocarbon group, such as methylene, ethylene, propylene and the like; aryl groups such as phenyl, tolyl and the like; or by groups containing hetero atoms, such as oxygen, nitrogen or sulphur. This intervening group, likewise, may be a straight or branched chain group, and may contain aromatic or heterocyclic nuclei.

A wide variety of substituents may be present on the nitrogen atom of the amino group, and on the nitrogen atom of the quaternary ammonium group. These include simple alkyl groups such as methyl, ethyl, propyl, dodecyl, octadecyl and the like, substituted alkyl groups such as hydroxyethyl, aryl or heterocyclic groups such as phenyl, thienyl, pyridyl and the like. Similarly, these nitrogen atoms can be part of a heterocyclic ring, as in the case of some of the compounds listed hereinafter.

The list appearing below includes aminoquaternary ammonium compounds which can be used in the present invention. The amino group in these compounds may either be in the form of a free amine or in the form of a salt. Typical acids which may be used for the formation of the salt include formic, acetic, hydrochloric, nitric, phosphoric and so forth.

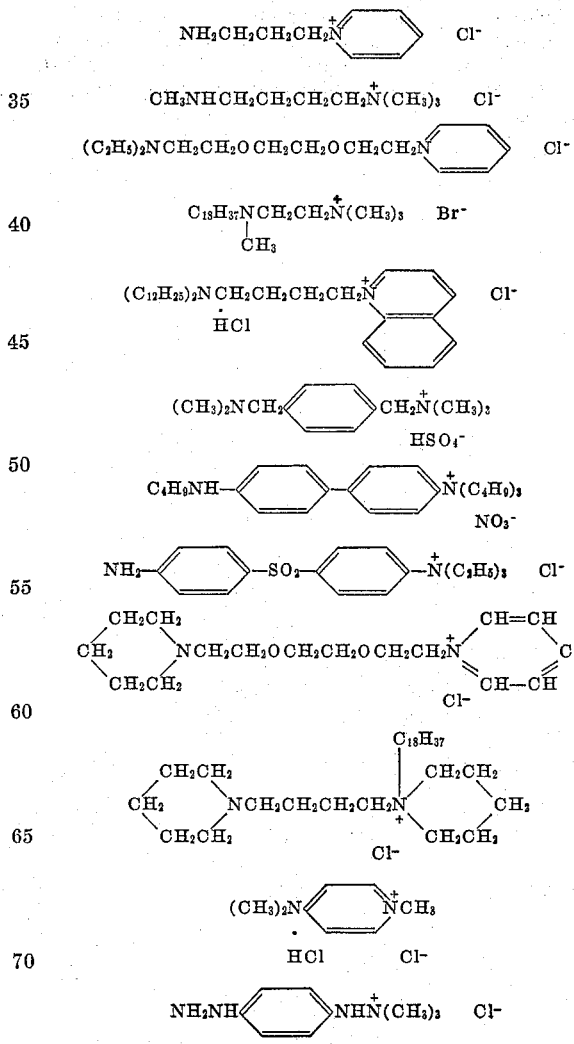

The treatment of the soil with these conditioners may be effected in either of two ways. The aminoquaternary ammonium compound may be stirred as a dry powder into the dry soil. Addition of water then brings about the reaction which confers porosity onto the soil. The other method involves the addition of the aminoquaternary ammonium compound to the soil in the form of an aqueous solution.

*Example 1*

Tributylamine was heated with excess triglycol dichloride. Removal of the excess triglycol dichloride left a chloroquaternary compound,

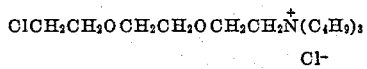
Cl⁻

This was heated with excess diethylamine to yield the hydrochloride of 2 - [2 - (2 - diethylaminoethoxy)ethoxy] ethyltributylammonium chloride. This compound (50 parts of an aqueous 1% solution) was added to 100 parts of crushed dry clay soil. When dry, this material was an easily crumbled mass.

A sample of the same soil, wet with water containing no conditioner, dried to a hard, bricklike mass.

*Example 2*

An aqueous 1% solution of the hydrochloride of the aminoquaternary of Example 1 was prepared. This solution (50 parts) was added to 100 parts of crushed dry clay soil. When the mixture was dry, it was a very friable soil.

*Example 3*

The hydrochloride of N-(4-piperidinobutyl)-pyridinium chloride was prepared from pyridine, piperidine and 1,4-dichlorobutane in a manner similar to that described in Example 1. A solution of 0.25 part of this compound in 50 parts of water was poured onto 100 parts of crushed, dry clay soil. When dry, this soil was an easily crumbled material.

*Example 4*

The hydrochloride of the aminoquaternary of Example 3 (0.3 part) was dissolved in 50 parts of water. This solution was poured onto crushed dry clay soil (100 parts). When dry, the soil was friable and easily worked.

For purposes of comparison, two samples of the same soil used for the above examples were treated with a salt of a copolymer of maleic acid and vinyl acetate (a polyanionic soil conditioner now on the market). In one sample 0.1% by weight of the conditioner was used; in the other, 0.5%. Both were wet with water and allowed to dry. While in each case the treated soil absorbed water rapidly, the soil after drying was very hard.

I claim as my invention:

1. Clay soil conditioned with from 0.05 to 1% by weight of a monomeric aminoquaternary ammonium compound which is soluble in water at least to the extent of 0.1% by weight and in which the amino group is sufficiently basic to form an acetate salt.

2. Clay soil conditioned with from 0.05–0.5% by weight of a monomeric aminoquaternary ammonium compound which is soluble in water at least to the extent of 0.1% by weight and in which the amino group is sufficiently basic to form an acetate salt.

3. Clay soil conditioned with from 0.05 to 1% by weight 2 - [2 - (2-diethylaminoethoxy)ethoxy] ethyltributylammonium chloride.

4. Clay soil conditioned with from 0.05 to 1% by weight 2-[2-(2-piperid-1-ylethoxy)ethoxy] ethylpyridinium chloride.

References Cited in the file of this patent
UNITED STATES PATENTS

| | | |
|---|---|---|
| 2,214,352 | Schoeller et al. | Sept. 10, 1940 |
| 2,378,235 | Miles | June 12, 1945 |
| 2,589,674 | Cook et al. | Mar. 18, 1952 |
| 2,614,917 | Zuckel | Oct. 21, 1952 |
| 2,625,529 | Hendrick et al. | Jan. 13, 1953 |
| 2,751,713 | Abramitis | June 26, 1956 |

UNITED STATES PATENT OFFICE

CERTIFICATE OF CORRECTION

Patent No. 2,831,779

April 22, 1958

John G. Erickson

It is hereby certified that error appears in the above numbered patent requiring correction and that the said Letters Patent should read as corrected below.

In the grant, lines 1 to 3, for "John G. Erickson, of Minneapolis, Minnesota," read -- John G. Erickson, of Minneapolis, Minnesota, assignor to General Mills, Inc., a corporation of Delaware, --; line 12, for "John G. Erickson, his heirs" read -- General Mills, Inc., its successors --; in the heading to the printed specification, line 3, for "John G. Erickson, Minneapolis, Minn." read -- John G. Erickson, Minneapolis, Minn., assignor to General Mills, Inc., a corporation of Delaware --.

Signed and sealed this 21st day of April 1959.

(SEAL)

Attest:

KARL H. AXLINE
Attesting Officer

ROBERT C. WATSON
Commissioner of Patents